United States Patent [19]

Meissner et al.

[11] Patent Number: 5,269,418
[45] Date of Patent: Dec. 14, 1993

[54] BAR FOR STORAGE RACK SYSTEM

[75] Inventors: Ernest H. Meissner, Bernardsville; William B. Morgan, Union, both of N.J.

[73] Assignee: Vital Records, Inc., Flagtown, N.J.

[21] Appl. No.: 881,985

[22] Filed: May 12, 1992

[51] Int. Cl.⁵ .................................................. A47F 5/00
[52] U.S. Cl. ..................................... 211/183; 211/41; 211/162; 211/189; 211/13
[58] Field of Search ............... 211/13, 102, 123, 124, 211/206, 41, 126, 152, 183, 189

[56] References Cited

U.S. PATENT DOCUMENTS

| | | | |
|---|---|---|---|
| 739,027 | 9/1903 | Raum | 211/13 |
| 3,194,566 | 7/1965 | Moore | 211/40 X |
| 3,298,530 | 1/1967 | Clouthier | 211/40 |
| 4,279,397 | 7/1981 | Larsson | 312/245 X |
| 4,573,589 | 3/1986 | Atkinson | 211/41 |
| 4,579,231 | 4/1986 | Price | 211/41 |
| 4,688,682 | 8/1987 | Price et al. | 211/41 |
| 4,830,198 | 5/1989 | Colquitt | 211/13 |

FOREIGN PATENT DOCUMENTS

| | | | |
|---|---|---|---|
| 1237037 | 1/1961 | France | 312/245 |
| 257296 | of 1857 | United Kingdom | 312/111 |

*Primary Examiner*—David A. Scherbel
*Assistant Examiner*—Korie Chan
*Attorney, Agent, or Firm*—Notaro & Michalos

[57] ABSTRACT

A bar to be used in a storage rack system is provided for the dual storage of computer tape reels and/or computer tape packs. The storage rack system has a series of bars arranged in rows and columns. The storage rack system has flexibility in that the bars are of one uniform design such that computer tape reels and packs can be stored simultaneously in one system.

15 Claims, 5 Drawing Sheets

BAR FOR STORAGE RACK SYSTEM

FIELD AND BACKGROUND OF THE INVENTION

The present invention relates in general to storage rack systems and in particular to a new and useful bar for a storage rack system for the dual storage of computer tape reels and computer tape packs or cartridges.

There are several existing storage rack systems that utilize racks or bars for storing items such as computer tape reels and so called computer tape 20-packs or cartridges.

U.S. Pat. No. 4,600,107 to Price, et al. discloses a tape cartridge storage system that uses a series of parallel shelves. The shelves are arranged in such a manner that they consist of a top, a back, and bottom and sides with an open front. This arrangement results in a compartment which can accommodate computer tape packs. The computer tape pack is stored in this shelving arrangement by placing the pack onto the shelf. Each pack is arranged so that the upper and lower lip of the pack rests flushly against the shelf edge.

U.S. Pat. No. 4,688,682 and U.S. Pat. No. 4,782,958 to Price, et al. also disclose tape cartridge storage systems. Both systems pertain to computer tape pack storage onto arranged shelving.

U.S. Pat. No. 4,815,795 to Accumanno discloses a holder for tape cartridges whereby cartridges are filed in a compartment and are stored in the compartment through the use of a rib. The rib is a protrusion or an extension located at the base of each separate compartment so that once the cartridge is inserted into the compartment, it is held in place in a firm manner by the rib.

U.S. Pat. No. 4,579,231 to Price '231 discloses a pull-out data tape storage system whereby a grooved bar is used for computer tape reel storage. Several tape reel support brackets or latches are mounted along the contour of each bar. Through the mounting of these brackets or latches, computer tape reel filing is permitted by engaging the latch located on the computer tape reel to the tape reel support bracket.

U.S. Pat. No. 4,573,589 to Atkinson discloses a reel stabilizer and ejection device used for computer tape reel storage employs a series of parallel shelves. Each shelf has a series of apertures or openings arranged throughout the face of the shelf. The inside edges of each aperture have a reverse bent portion which provides an enlarged contact surface so that it can easily engage the latch from the computer tape reel once it is placed into the aperture. This invention allows the storage and filing of computer tape reels to be arranged or hung on each shelf.

U.S. Pat. No. 3,310,178 to Wright discloses a reel storage apparatus comprising parallel shelving made of elongated sheet metal and horizontally suspended between sides of a rack. The shelving contains a series of arranged apertures located along the outer face of the shelving so that the latch of the computer tape reel can be hooked into the aperture for filing and storage. Within the elongated sheet metal shelving is a stiff straight cylindrical hanger rod of which access is gained through each aperture in the face of the shelving. Each computer tape reel latch is placed through the aperture and engages the cylindrical rod.

Several storage bars exist for use in conjunction with storage rack systems. FIG. 5 is a prior art bar used solely for the hanging of computer tape reels. FIG. 6 is a prior art bar used to store computer tape racks only, in particular so called 20-packs.

Although bars or rods used for storing computer tape reels and computer tape packs exist, there is no bar known that has the dual capacity to accommodate both computer tape reels and packs. There are no known storage rack systems that employ bars of one uniform design providing a versatility to store both computer tape reels and packs simultaneously along the length of the same bar, or in one rack having a plurality of the same bar.

SUMMARY OF THE INVENTION

It is an object of the present invention to provide a bar for both the storage of computer tape reels and packs simultaneously.

Another object of the present invention is to provide a storage rack system that employs bars of one uniform design with the capacity of storing both computer tape reels and packs.

A further object of the present invention is to provide a dual capacity bar for storing computer tape reels and tapes with a low friction insert allowing stored items to be easily slidably moved and aligned along the length of the bar.

Another object of the present invention is to provide a storage rack system for the storage of computer tape reels and packs that eliminates design complications for the system due to having a predetermined "reel to pack" ratio, and inventory and ordering problems where two different rack system bars must be used.

Another object of the present invention is to eliminate the inefficiencies involved with changing the storage media and therefore having to store and replace old bars with new bars or having to buy a new storage rack system to accommodate the change in media.

The present invention comprises a bar to be used in a storage rack system for computer tape reels or computer tape packs. The bar can be constructed of a material such as metal and so that its cross-sectional shape is in the form of two parallel U's, joined to each other, one U facing upwardly, while the adjacent U faces in a downward direction.

The upright U shape is a catch section comprising a catch leg, which is a vertically extending section from the top section to a catch base. The catch base forms a curved portion of the U-shaped catch section. A catch extension extends upward and outward from the catch base at an angle of approximately 20°–60° and forms a second upright of the U-shaped catch section. The catch extension is designed such that it is easily engageable with the latch of a computer tape reel.

The downward facing U-shaped portion is a slot section for housing the lip of a computer tape pack. The slot section comprises a slot leg vertically extending from the top section to a slot base. A slot extension extends upward and outward from the slot base completing the U-shape.

The unique configuration of the invention provides a receiving space, the area below the top section and between the catch section and the slot section, for receiving the lip of a computer tape pack.

A low friction insert, which can be made, for example, of a material such as TEFLON, (a trademark) material is provided in the slot section for the easy slidable movement of a computer tape pack lip along the length of the slot section.

The present invention is designed to be used in series such that a storage rack system is formed having rows and columns of bars having one uniform design providing the dual capacity of storing both computer tape reels and computer tape packs.

The storage rack system comprises a plurality of frames, e.g. four, positioned vertically and having a plurality of frame openings which are spaced along the length of each frame. A plurality of supports extend horizontally between the frames for support purposes and are connected to the frames at the frame openings. Support openings are provided along the length of the supports for receiving the ends of the bars. The bars are positioned between the supports at 90° angles and are joined be connecting attachments located at each end of the bar to the support openings.

The unique arrangement allows the simultaneous storage of computer tape reels and packs without using different bars in the storage rack system. Computer tape reels are easily stored by engaging the latches from the reels to the catch extension of the bar. While at the same time, a computer tape pack is easily stored by placing one lip of the pack in the slot section of a bar and the opposite lip of the pack in receiving space of the bar arranged in the column.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which the preferred embodiments of the invention are illustrated.

DESCRIPTION OF THE PREFERRED EMBODIMENTS

Figure 1:
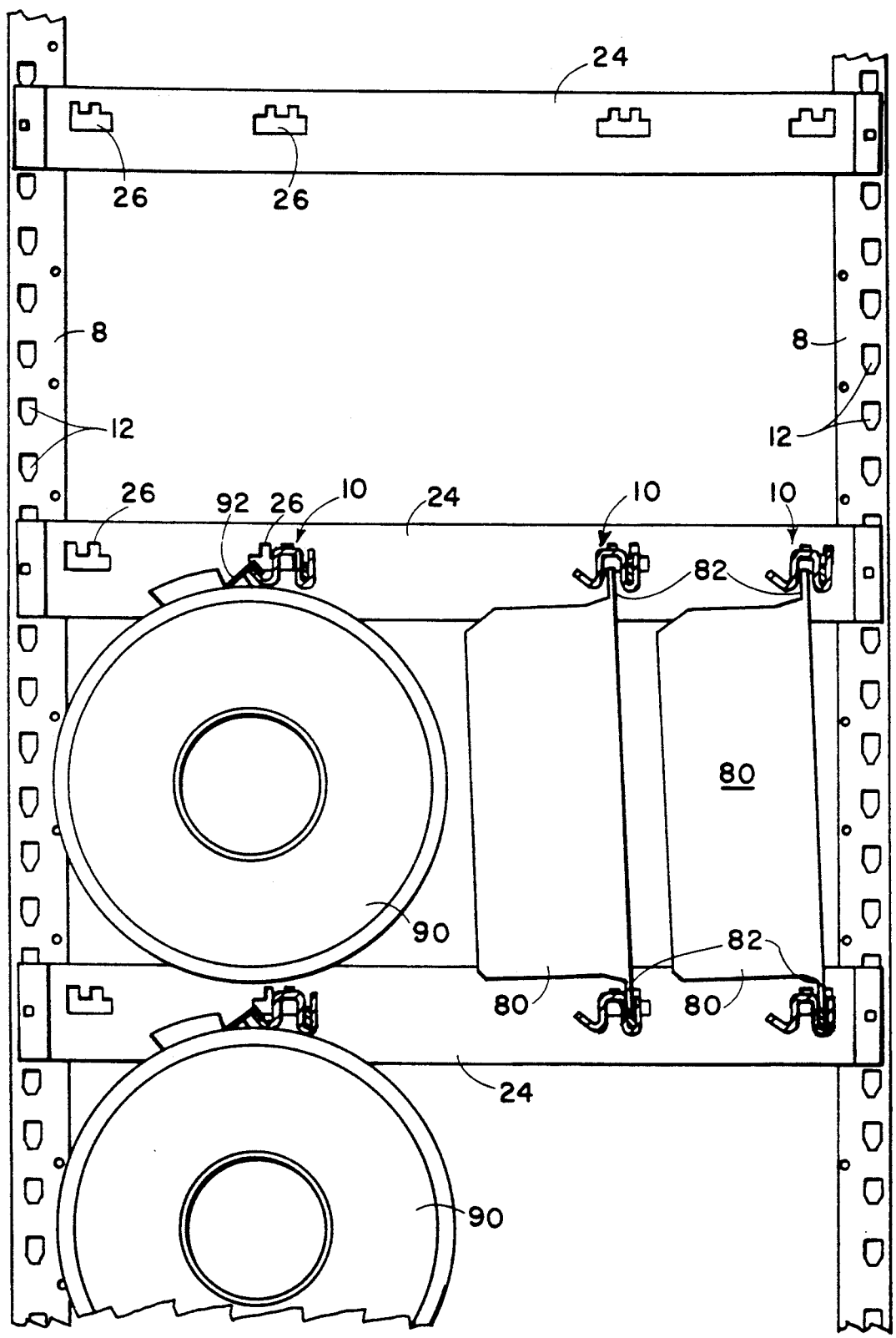
FIG. 1 is a side view of a computer tape storage system employing the present invention in a series of rows and columns.

Referring to the drawings in particular, in invention embodied in FIG. 1 comprises a storage rack system 5 for the storage of computer tape reels 90 and computer tape packs 80.

A plurality of frames 8 are positioned vertically and can be arranged in a box type arrangement whereby one frame 8 is located at each corner. A plurality of supports 24 extend horizontally between pairs of frames 8 and are connected to the frames 8 at frame opening 12 which are spaced along the length of each frame 8 and form attachment sites.

Figure 4:
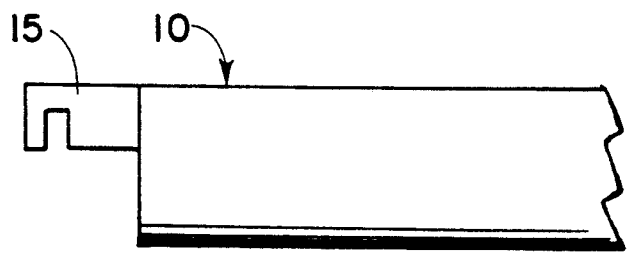
FIG. 4 in a partial view of the bar with attachment means.
Figure 5:
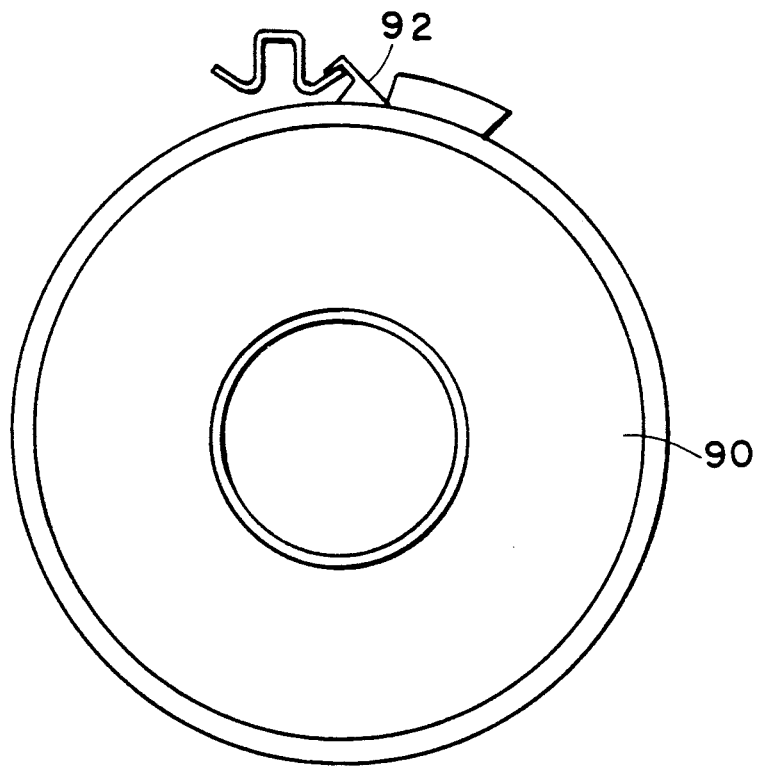
FIG. 5 is a side view of the prior art used to store a computer tape reel.
Figure 6:
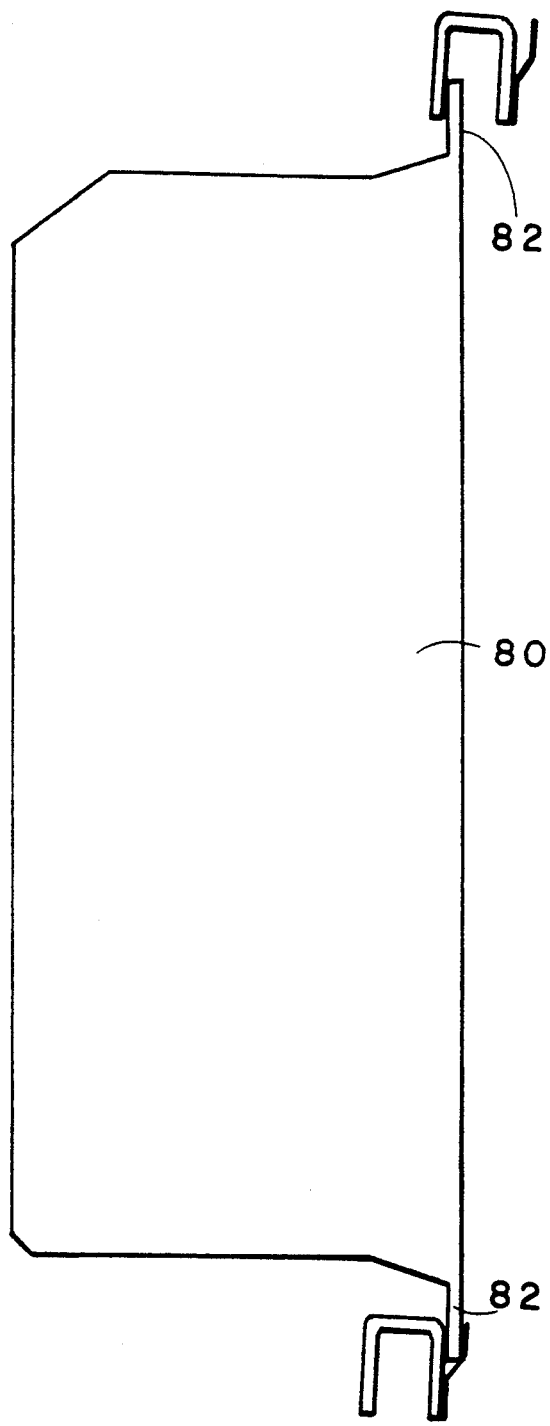
FIG. 6 is a side view of the prior art used to store a computer tape pack.

Bars 10 are arranged in a series of horizontal rows and columns between corresponding pairs of supports 24, and at 90° to the supports. Each bar 10 is connected to a support 24 at a support site or opening 26 by a bar attachment 15, depicted in FIG. 4. A bar attachment 15 shown in FIG. 4 is provided at each of a bar 10.

Figure 2:
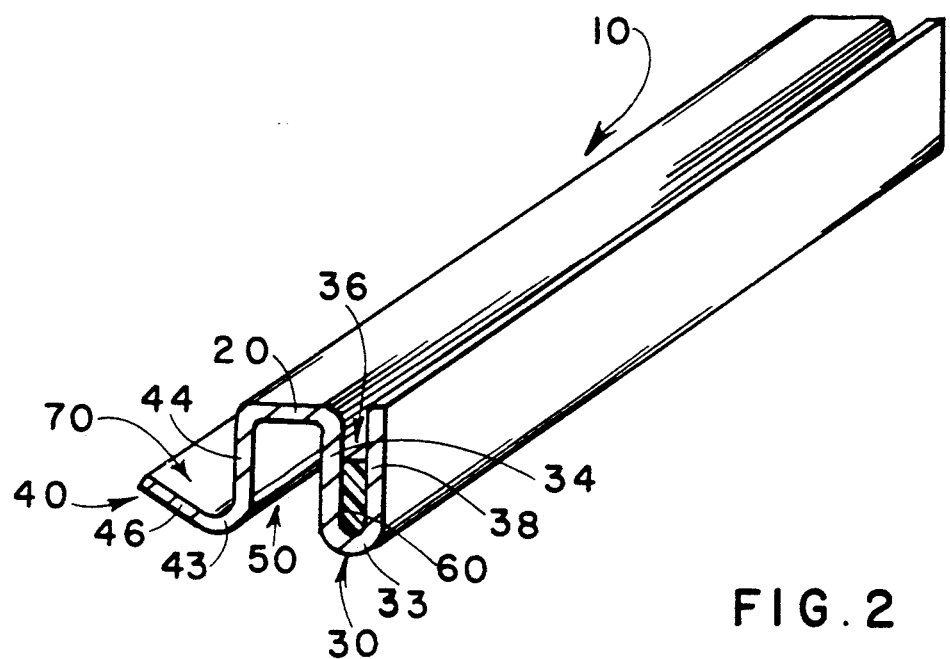
FIG. 2 is a perspective view of an embodiment of the present invention.

FIG. 2 shows the bar 10 having a cross section with a unique configuration such that it consists of a top section 20 arranged between a catch section 40 and a slot section 30.

The catch section 40 is for the hanging of computer tape reels and comprises a catch leg 44 extending vertically and downward from the top section 20 to a catch base 43. A catch extension 46 extends outward and upward from the catch base 43 at an approximate angle ranging from 20° to 60° forming a catch area 70 for a latch 92 on a reel 90 as shown in FIG. 1.

FIG. 1 shows that a computer tape reel 90 is easily engaged with a bar 10 by engaging the reel latch 92 with the catch extension 46 in the catch area 70.

The slot section 30 in FIG. 2 comprises a slot leg 34 extending vertically downward from the top section 20 to a slot base 33. A slot extension 38 extends upward from the slot base 33 such that a slot 36 is formed between the slot leg 34 and the slot extension 38. An optional slot insert 60 is provided in the slot 36 for providing a low friction surface in the floor of slot 36 in order to easily slide a lip 82 of a computer tape pack 80 shown in FIG. 1, along the bar 10. Insert 60 is advantageously made of low friction material such as plastic or tetrafluoroethylene coated materials.

FIG. 1 shows that a computer tape pack 80 is stored between a pair of bars 10 arranged in a column by positioning a lip 82 of a computer tape pack 80 in the slot 36 of a bar 10 and positioning the opposite lip 82 in a receiving space 50 of a bar 10 arranged immediately above. Receiving space 50 is defined between catch leg 44 and slot leg 34, and below top section 20.

FIG. 1 also shows the flexibility of the storage rack system 5 in that each bar 10 has the dual capacity to store both computer tape reels 90 and computer tape packs 80.

Advantageously all of the bars 10 can be positioned so that their catch extension 46, extends in the same direction of the rack system 5. In this way, reels 90 are advantageously loaded from one side of the rack, for example, from the left side as seen in FIG. 1, while packs 80 can be loaded from the opposite side, for example from the right side in FIG. 1.

The invention can also be used with some of the bars reversed, that is with their extension 46 extending in an opposite direction.

The vertical spacing between the bars 10, 10 in a vertical column, which is dictated by the spacing between the horizontal supports 24, is selected to be approximately the same as the vertical length of the computer tape pack 80. This corresponds substantially to the vertical height of a computer tape reel 90 so that no special spacing for the supports is necessary. As best shown in FIG. 1, two bars 10, 10 which are horizontally spaced from each other on a single support 24, are relatively close to each other, correspond substantially to the width of each tape pack 80. A somewhat wider spacing is required to accommodate one reel 90.

Figure 3:
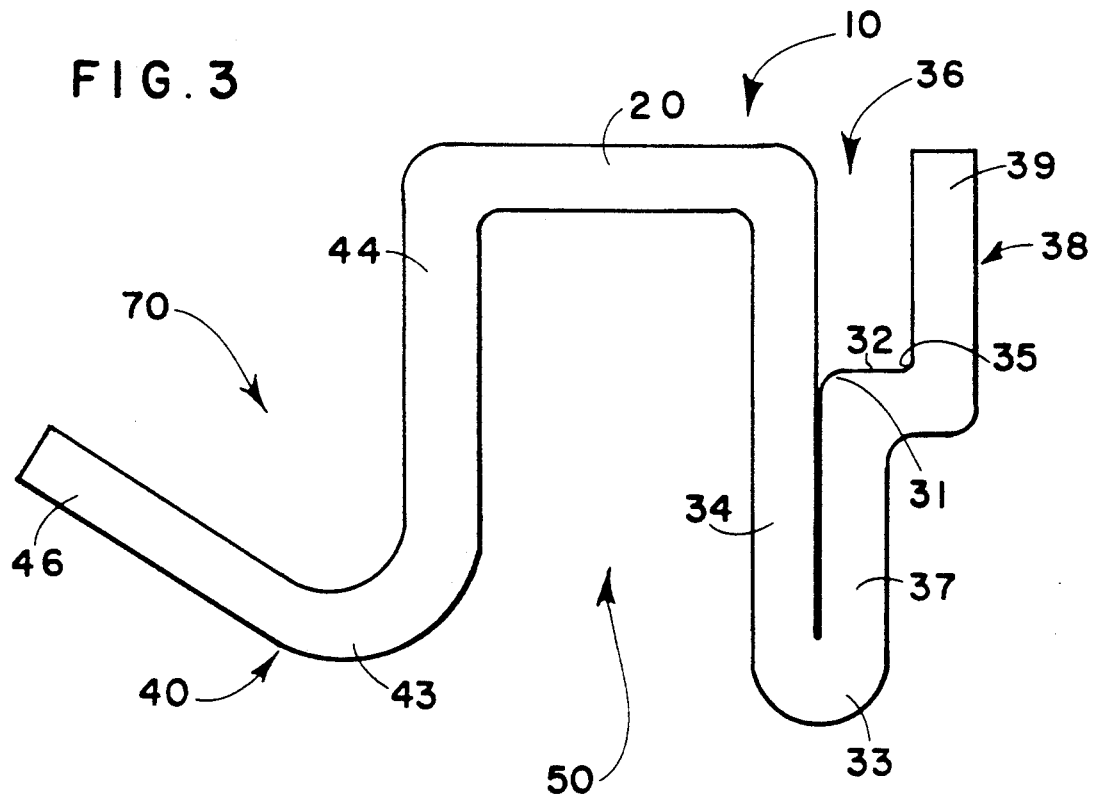
FIG. 3 is a vertical sectional view of another embodiment of the present invention.

FIG. 3 illustrates a different embodiment of a bar 10 in that the slot section 30 comprises a slot extension 38 having a lower portion 37 extending from the base 33 to a step 32. The step 32 has front end 31 positioned nearest the slot leg 34 and a back end 35 located at the opposite end of the step 32. An upper portion 39 of the slot extension 38 extends upwardly from the back end 35 of the step 32 forming the slot 36. In FIG. 3 the same reference numerals are used to designate the same or functionally similar parts.

Figure 3A:
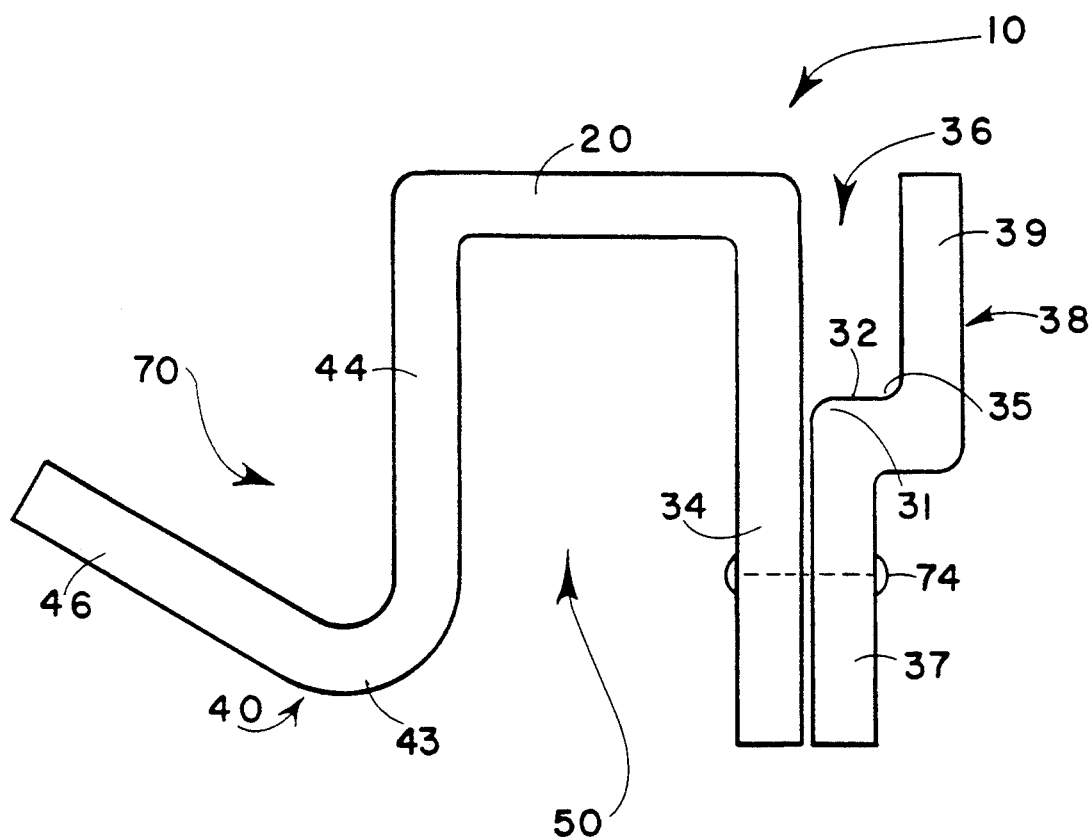
FIG. 3a is a view similar to FIG. 3 of another embodiment of the invention.

Referring to FIG. 3a, a still further embodiment of the invention which is structurally related to the embodiment of FIG. 3, is made of two pieces of bent metal, one forming the top section 20 and catch section 40, and the other forming the slot section 30 which is spot welded or riveted at 74 to leg 34 of the top section 20 and catch section 40.

It should be understood that the rack system used in conjunction with the bar of the present invention can be exchanged with other systems including uprights and crossing supports, while still taking advantage of the dual storage capacity of the bar of the present invention.

While the specific embodiments of the invention have been shown and described in detail to illustrate the application of the principles of the invention, it will be understood that the invention may be embodied otherwise without departing from such principles.

What is claimed is:

1. A storage rack system for dual storage of computer tape reels having latches and computer tape packs having upper and lower lips, the system having opposite sides for receiving reels and packs, and comprising:
   a pair of spaced apart and vertically extending frames (8) at each side of the system, each frame having a plurality of attachment sites spaced along the length of each frame;
   a plurality of supports (24) each extending horizontally between a frame at one side and a frame at the opposite side of the system, and joined to the frames at the frame attachment sites, each of said support having a plurality of support sites (26) spaced along the length thereof, some of said supports being vertically spaced between a pair of frames at each side of the system;
   a plurality of bars extending between the sides of the system and between pairs of supports, the bars being connected to the supports at the support sites, each bar comprising:
   an elongated and substantially horizontal top section (20) having a catch section (40) at one side and a slot section (30) at an opposite side;
   the catch section (40) comprising an elongated substantially vertical catch leg (44) extending downwardly from the top section to a catch base (43), and an elongated catch extension (46) extending upwardly and outwardly from the catch base, at an acute angle to form a catch area (70) between the catch extension and the catch leg for receiving a reel latch to hang a computer tape reel on one side of the bar;
   the slot section (30) having an elongated and substantially vertical slot leg (34) extending downwardly from the top section to a slot base (33), and an elongated and substantially vertical slot extension (38), extending upwardly from the slot base, for forming a slot (36) between the slot extension and the slot leg for a lower lip of a computer tape pack on an opposite side of the bar; and
   a receiving space (50) formed below the top section and between the catch section and the slot section for an upper lip of a computer tape pack.

2. A system according to claim 1, including a computer tape pack having upper and lower spaced lips and the spacing between vertically spaced supports on each pair of frames at the opposite sides of the system is approximately equal to a spacing between upper and lower lips of the computer tape pack.

3. A system according to claim 2, wherein at least two bars are connected to one support and are spaced from each other by a distance approximately equal to a width of a computer tape pack on one side of the system, and at least one additional bar spaced at a greater distance from the remaining bars on said one support.

4. A system according to claim 3, wherein all catch extensions of all bars of the system extend in the same direction.

5. A system according to claim 1, including a low friction insert in said slot (36) for slidable supporting a lower lip of a computer tape pack.

6. A system according to claim 5, wherein the bar is made of a single piece of sheet metal bent to form all parts of the bar except for said insert member.

7. A system according to claim 1, wherein the slot extension (38) comprises a step (32) having a front end (31) and a back end (35), the front end positioned at a shorter distance from the slot leg than the back end, the slot extension having a lower portion extending downwardly from the front end of the step to the slot base (33) and an upper portion (39) extending upwardly from the back end of the step.

8. A system according to claim 7, wherein the bar is made of a single piece of sheet metal bent to form all parts of the bar.

9. A system according to claim 1, wherein at least part of the slot section is made of a different piece of material from the top section and catch section.

10. A bar (10) for use in a frame providing dual storage capacity for computer tape reels having latches and computer tape packs having upper and lower lips, the bar comprising:
    an elongated and substantially horizontal top section (20) having a catch section (40) at one side and a slot section (30) at an opposite side;
    the catch section (40) comprising an elongated substantially vertical catch leg (44) extending downwardly from the top section to a catch base (43), and an elongated catch extension (46) extending upwardly and outwardly from the catch base, at an acute angle to form a catch area (70) between the catch extension and the catch leg for receiving a reel latch to hang a computer tape reel on one side of the bar;
    the slot section (30) having an elongated and substantially vertical slot leg (34) extending downwardly from the top section to a slot base (33), and an elongated and substantially vertical slot extension (38), extending upwardly from the slot base, for forming a slot (36) between the slot extension and the slot leg for a lower lip of a computer tape pack on an opposite side of the bar;
    a receiving space (50) formed below the top section and between the catch section and the slot section for an upper lip of a computer tape pack; and
    a low friction insert member (60) in said slot (36) near said slot base (33) for defining an upper slide surface along which a lower lip of a computer tape pack can slide along the bar.

11. A bar according to claim 10, wherein the bar is made of a single piece of sheet metal bent to form all parts of the bar except for said insert member.

12. A bar (10) for use in a frame providing dual storage capacity for computer tape reels having latches and computer tape packs having upper and lower lips, the bar comprising:

an elongated and substantially horizontal top section (20) having a catch section (40) at one side and a slot section (30) at an opposite side;

the catch section (40) comprising an elongated substantially vertical catch leg (44) extending downwardly from the top section to a catch base (43), and an elongated catch extension (46) extending upwardly and outwardly from the catch base, at an acute angle to form a catch area (70) between the catch extension and the catch leg for receiving a reel latch to hang a computer tape reel on one side of the bar;

the slot section (30) having an elongated and substantially vertical slot leg (34) extending downwardly from the top section to a slot base (33), and an elongated and substantially vertical slot extension (38), extending upwardly from the slot base, for forming a slot (36) between the slot extension and the slot leg for a lower lip of a computer tape pack on an opposite side of the bar;

a receiving space (50) formed below the top section and between the catch section and the slot section for an upper lip of a computer tape pack; and the slot extension (38) comprising a step (32) having a front end (31) and a back end (35), the front end positioned at a shorter distance from the slot leg than the back end, the slot extension having a lower portion extending downward from the front end of the step to the slot base (33) and an upper portion (39) extending upwardly from the back end of the step.

13. A bar according to claim 12, wherein the lower section and upper section of the slot extension is made of a separate piece of material which is fixed to the slot leg.

14. A bar according to claim 12, wherein the bar is made of a single piece of sheet metal bent to form all parts of the bar.

15. A bar (10) for use in a frame providing dual storage capacity for computer tape reels having latches and computer tape packs having upper and lower lips, the bar comprising:

an elongated and substantially horizontal top section (20) having a catch section (40) at one side and a slot section (30) at an opposite side;

the catch section (40) comprising an elongated substantially vertical catch leg (44) extending downwardly from the top section to a catch base (43), and an elongated catch extension (46) extending upwardly and outwardly from the catch base, at an acute angle to form a catch area (70) between the catch extension and the catch leg for receiving a reel latch to hang a computer tape reel on one side of the bar;

the slot section (30) having an elongated and substantially vertical slot leg (34) extending downwardly from the top section to a slot base (33), and an elongated and substantially vertical slot extension (38), extending upwardly from the slot base, for forming a slot (36) between the slot extension and the slot leg for a lower lip of a computer tape pack on an opposite side of the bar;

a receiving space (50) formed below the top section and between the catch section and the slot section for an upper lip of a computer tape pack; and an attachment (15) connected at each opposite end of the bar for engagement with a frame of a storage rack system.

* * * * *